(12) United States Patent
Dwyer

(10) Patent No.: US 7,194,903 B2
(45) Date of Patent: Mar. 27, 2007

(54) SUSPENSION MECHANISM FOR HIGH PERFORMANCE ACCELEROMETERS

(75) Inventor: Paul Dwyer, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 107 days.

(21) Appl. No.: 11/012,822

(22) Filed: Dec. 14, 2004

(65) Prior Publication Data
US 2006/0123904 A1  Jun. 15, 2006

(51) Int. Cl.
G01P 1/02 (2006.01)
G01P 15/00 (2006.01)

(52) U.S. Cl. ...................................... 73/493; 73/514.38
(58) Field of Classification Search .................. 73/493, 73/514.38
See application file for complete search history.

(56) References Cited

U.S. PATENT DOCUMENTS

| 2,237,326 A | * | 4/1941 | Barry .......................... 73/502 |
| 2,689,723 A | * | 9/1954 | Von Basel ............... 73/514.38 |
| 3,089,342 A | * | 5/1963 | Willis ...................... 73/514.38 |
| 3,240,073 A | * | 3/1966 | Pitzer ...................... 73/514.38 |
| 3,425,282 A | * | 2/1969 | Entin ....................... 73/514.38 |
| 3,482,121 A | | 12/1969 | Hatschek |
| 3,507,158 A | | 4/1970 | Wilcox et al. |
| 3,601,343 A | | 8/1971 | Sivaslian |
| 3,743,869 A | | 7/1973 | Hugli |
| 4,190,782 A | | 2/1980 | Guess |
| 4,266,157 A | | 5/1981 | Peters |
| 4,467,651 A | | 8/1984 | Peters et al. |
| 4,592,234 A | | 6/1986 | Norling |
| 4,726,228 A | | 2/1988 | Norling |
| 4,854,169 A | | 8/1989 | Sakuma et al. |
| 4,872,342 A | | 10/1989 | Hanson et al. |
| 5,097,172 A | * | 3/1992 | Becka .......................... 310/348 |
| 5,212,984 A | * | 5/1993 | Norling et al. ................ 73/493 |
| 5,265,471 A | * | 11/1993 | Kawauchi et al. ............ 73/493 |
| 5,287,744 A | | 2/1994 | Norling et al. |
| 5,723,787 A | * | 3/1998 | Stoddard et al. ............... 73/493 |
| 5,890,569 A | * | 4/1999 | Goepfert ...................... 188/378 |
| 6,578,682 B2 | * | 6/2003 | Braman et al. ............. 188/378 |
| 6,865,944 B2 | | 3/2005 | Glenn et al. |
| 6,949,807 B2 | | 9/2005 | Eskridge et al. |

* cited by examiner

Primary Examiner—Hezron Williams
Assistant Examiner—John C Hanley
(74) Attorney, Agent, or Firm—Black Lowe & Graham PLLC

(57) ABSTRACT

A suspension diaphragm (16) is configured to support a precision transducer (14) within a container (12). The suspension diaphragm (16) is buttressed by an underlying complaint preform (152) and an annular hybrid support (16B) disposed along the periphery of an opening of the container (12). The transducer (14) is affixed to the suspension diaphragm (16) using the compliant preform (152) and rigid epoxy in the securing channels (120). The annular hybrid support (16B) is affixed to the exterior of the container (12).

12 Claims, 3 Drawing Sheets

SUSPENSION MECHANISM FOR HIGH PERFORMANCE ACCELEROMETERS

BACKGROUND OF THE INVENTION

It is often necessary to isolate a precision transducer from external stress. Such stress may be caused by mechanical distortion of the case or other structure to which the transducer is mounted, or by differential thermal expansion or contraction between the transducer and the case. Isolation from external stress can in principle be achieved by using a compliant mounting system. However, a compliant mounting system will not in general provide precise and stable alignment of the transducer with respect to its case. For many transducers, such alignment is critical for achieving proper operation. A compliant mounting system may also result in unwanted mechanical oscillation of the transducer when the case is exposed to vibration.

One type of precision transducer that is especially susceptible to external stress is an accelerometer. This is due, in part, to the extreme level of accuracy being sought. An accelerometer is an example of an instrument that must not be allowed to change position or vibrate with respect to its case. One prior accelerometer mounting technique connects the accelerometer to the case by means of a metal ring or by means of a structural adhesive such as an epoxy resin. These prior non-compliant mounting techniques result in stress being transmitted to the accelerometer due to differential thermal expansion between the accelerometer and the mounting ring and case. These prior techniques also transmit stress to the accelerometer when the case is subjected to mechanical distortion. Distortion can be induced by mounting the case to a surrounding support, or by differential thermal expansion between the case and the support. Dimensional instabilities in epoxy joining materials can occur, especially at elevated temperatures. All such stresses may affect the output of a precision accelerometer, and may result in reduced stability. The temperature induced stresses also may lead to increased variation of accelerometer output with temperature, and may create thermally induced errors in the accelerometer output. Thus, an improved mounting system for a precision transducer would be an advance in the art that would be greatly welcomed.

SUMMARY OF THE PARTICULAR EMBODIMENTS

The present embodiments in general provide for a suspension diaphragm or device that is adapted to support a precision transducer and electronics, such as an accelerometer, within a supporting case or container. The mechanical element of the accelerometer is attached to the suspension diaphragm by a compliant preform and the electronics is attached via an integral, annular hybrid support that engages the diaphragm along the open edges of the case. The accelerometer may also be affixed to the suspension diaphragm by rigid epoxy through channels in the compliant preform. The annular hybrid support is affixed to the container exterior.

BRIEF DESCRIPTION OF THE DRAWINGS

Particular embodiments are described in detail below with reference to the following drawings.

DETAILED DESCRIPTION OF THE PARTICULAR EMBODIMENTS

Figure 1:
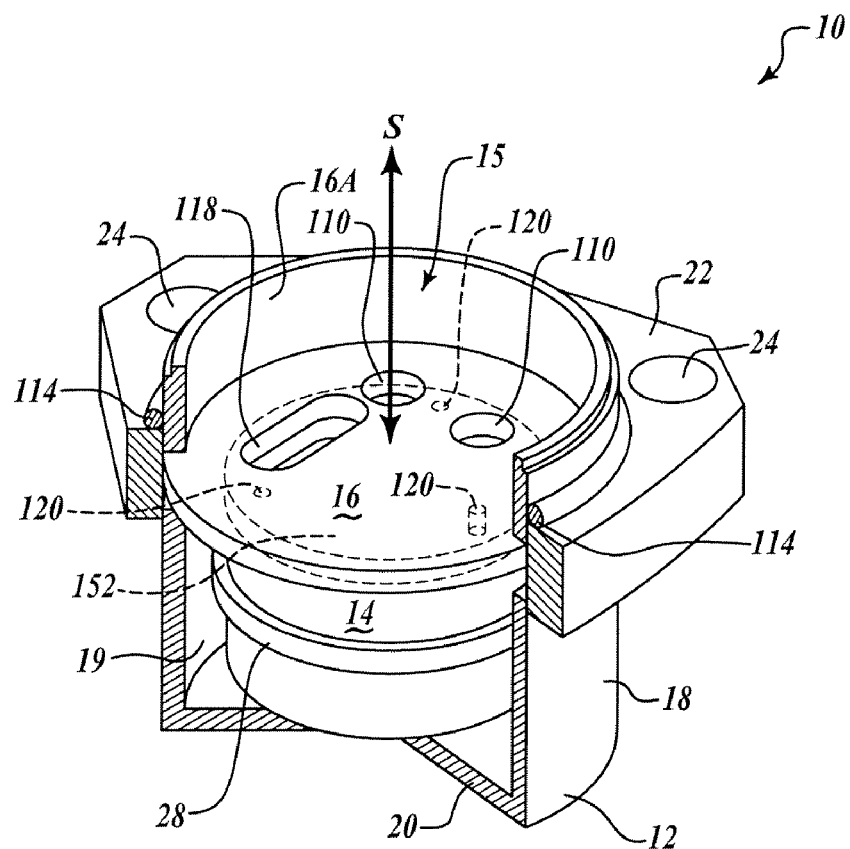
FIG. 1 is a perspective view of an accelerometer mounted in a case as formed in accordance with an embodiment of the present invention.

FIG. 1 is a perspective view of an assembly 10 with a mount system as formed in accordance with a particular embodiment. The assembly 10 includes a case or container 12 that is generally cylindrical, a transducer 14 and a suspension device or diaphragm apparatus 16. The case 12 includes a cylindrical sidewall 18 and a base 20, and is attached to a flange 22. The flange 22 includes mounting holes 24 that are used to mount to a supporting structure (not shown). In one embodiment, the case 12 is made from 304 stainless steel. The flange 22 may be welded to the sidewall 18 via a weld joint.

The suspension device 16 may be made from 304 stainless steel or substantially similar materials and is generally circular. The suspension device 16 is received within the flange 22. The suspension device 16 has one or more first conduit channels 110 and one or more second conduit channels 118. The conduit channels 110 and 118 may have various shapes, such as circular, oblong, square, triangular or cigar-shape. The shapes of the conduit channel 110 and 118 vary to accommodate different wiring requirements or harnesses. The number of conduit channels is not limited to three, but may vary according to the wiring requirements of the transducer 14, such as an accelerometer. The location or distribution of the conduit channels 110, 118 may vary to accommodate the wiring requirements of the transducer 14.

Beneath the suspension device 16 is a compliant preform 152 that is generally circular. The compliant preform has conduit channels that match the suspension device 16 conduit channels 110 and 118.

Distributed in a planar configuration is a plurality of securing channels 120 shown at dashed ovals on the surface of the suspension device 16, and one is presented in cross section of the preform 152. The securing channels 120 originate within the compliant preform 152 and contact the lower surface of the suspension device 16. As shown in FIG. 1, three securing channels 120 are more or less distributed in a triangular pattern. The shapes of the securing channels 120 may have various shapes, including circular, oblong, square, triangular, or cigar-shaped. Other configurations, such as linear, are possible depending on the number and positional arrangement of the securing channels 120. The securing channels 120 may receive rivets, staples, or fluid-like adhesives, including epoxy-based adhesives.

The transducer 14 has a generally cylindrical shape and includes a bellyband 28. In one embodiment, the transducer 14 is an accelerometer that is adapted to respond to accelerations along an axial disposed sensitive axis S by producing an electrical signal that indicates the direction and magnitude of such acceleration. The transducer 14 is suspended or held by the suspension device 16. As described below, the suspension device 16 provides precise and stable alignment of the transducer 14, such that the transducer is not free to undergo translational or rotational movement with respect to the case 12. Furthermore, the suspension device 16 restrains or isolates the transducer 14 from making contact with the side wall 18 and the base 20 of the case 12 by interposing a gap 19 between the transducer's perimeter and the internal walls of the case 12. The gap 19 and the suspension device 16 serve to isolate the transducer 14 from stresses that would otherwise result from distortion of the case 12 whenever the case 12 is not mounted on a flat surface or is exposed to deferential thermal expansion forces or temperatures. The gap 19 is filled with an inert gas.

The suspension device 16 includes an annular hybrid support 16A. The hybrid support 16A is welded to the flange joint 22 via a weld joint 114. The annular hybrid support 16A is disposed along the periphery of the suspension device 16 and serves to enhance or buttress the structural firmness of the suspension device 16.

Figure 2:
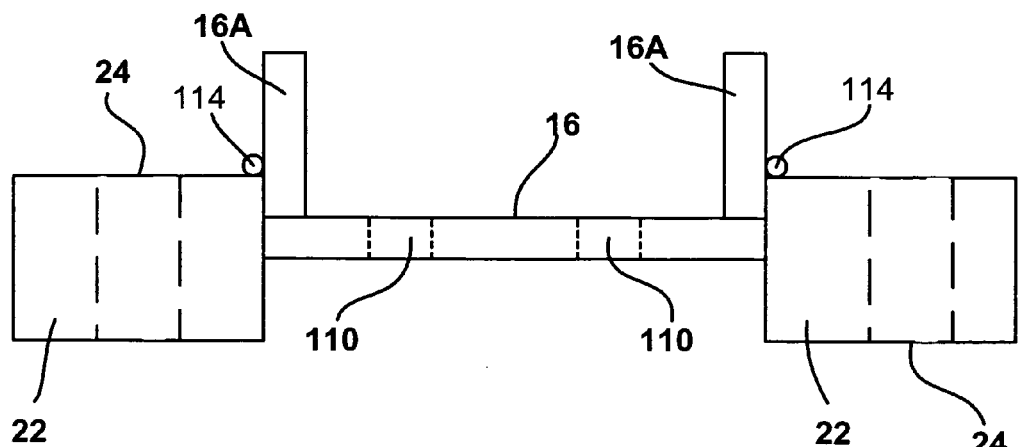
FIG. 2 is a cross sectional side view of a suspension diaphragm and a flange shown in FIG. 1.

FIG. 2 is a cross sectional side view of only the suspension device 16, the hybrid support 16A, and the flange 22. The channels 110 convey electrical wires or leads to and from the accelerometer 14. The cross sectional view further illustrates the peripheral position of the annular hybrid support 16A in relation to the suspension 16. The suspension device 16 and the hybrid support 16A is reside within the opening of the flange 22. The hybrid support 16A is affixed to the suspension 16 by adhesives or fused by welding. The hybrid support 16A is welded to the flange 22 via the weld joint 114. The weld joint 114 may have a bead formation acquired from welding the flange 22 to the hybrid support 16A. Alternatively, the flange 22 and the hybrid support 16A may be attached by a brazing process.

Figure 3:
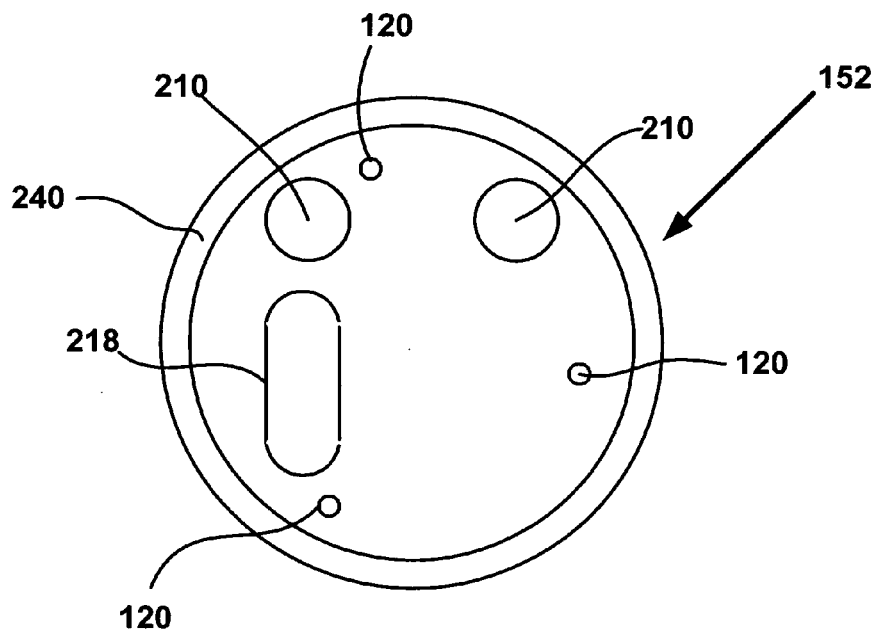
FIG. 3 is a top view of the preform showing the securing channels and matching conduit channels of the suspension diaphragm.

FIG. 3 is a top view of the preform 152. The preform 152 is generally circular and has conduit channels that generally match the number, shape, and location of the conduit channels 110, 118 of the suspension device 16. The preform 152 has one or more first conduit channels 210 and one or more second conduit channels 218. The conduit channels 210 and 218 may have various shapes, such as circular, oblong, square, triangular or cigar-shape. The shapes of the conduit channels 210 and 218 vary to accommodate different wiring requirements or harnesses. The number of conduit channels is not limited to three, but may vary according to the wiring requirements of the transducer 14, in both number and location. Interspersed with the conduit channels 210, 218 are the securing channels 120. The securing channels 120 are generally circularly shaped, but may vary in shape, number, location, and distribution. Along the periphery of the preform 152 is a reinforcing ring 240.

The perform 152 is a compliant, fiberglass-based low-stress epoxy adhesive film that is electrically insulating, substantially similar to Ablefilm 561 ® obtained from Ablestik, Inc., 20021 Susana Road, Rancho Donminguies, Calif. Other adhesive films substantially similar to Ablefilm 561 ® may be use provide the films are formulated to be electrically non-conductive. The reinforcing ring 240 is generally made of 304 stainless steel.

Figure 4:
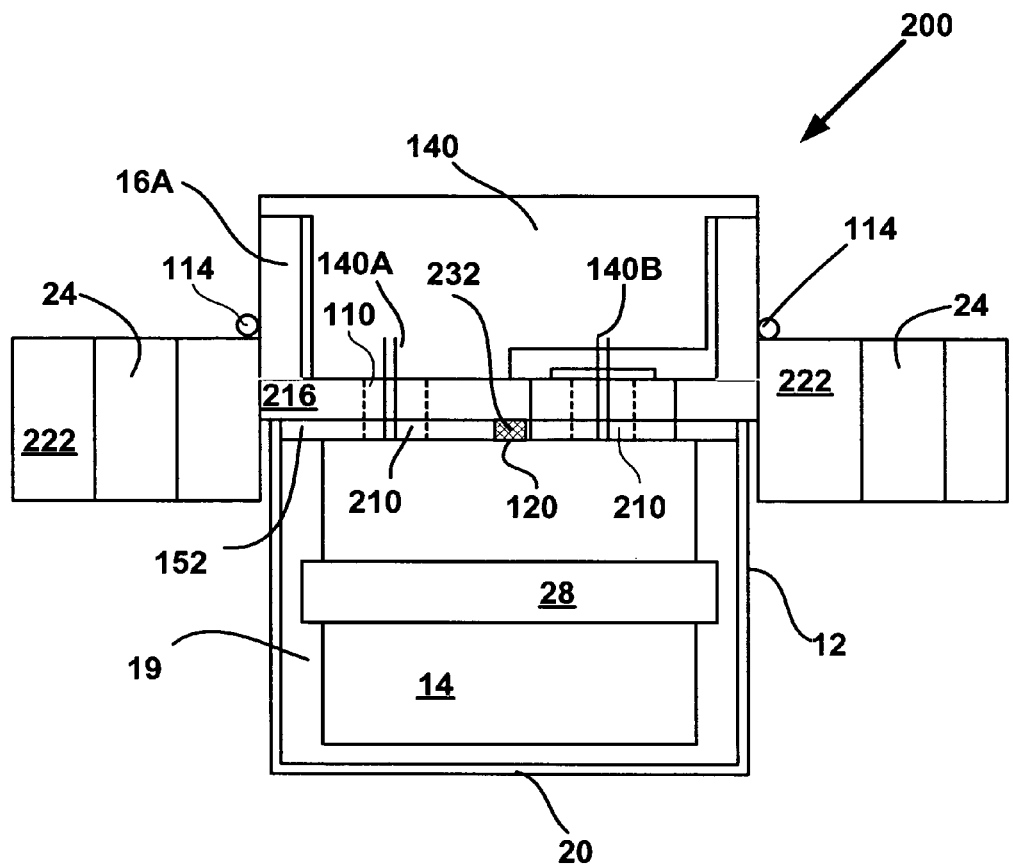
FIG. 4 is a cross sectional view of an alternate embodiment of the present invention.

FIG. 4 is a cross sectional view of an assembly 200 formed in accordance with an alternate embodiment of the suspension device 16 holding the transducer 14 and fitted into the container 12. The alternate embodiment is a suspension device 216 that is monolithic with the annular hybrid support 16A. The suspension device 216 is press fitted between a flange 222 and is affixed to the preform 152 that lies beneath the suspension device 216. The preform 152 straddles across the opening of the container 12.

In cross section the second conduit channels 210 of the preform 152 are shown with conduits 140A and 140B routed through the channels 210. The conduits 140A and 140B similarlu route through the channels 110 of the suspension 216. An epoxy plug 232 depicted in cross hatch is shown occupying one of the securing channels 120. The epoxy plug 232 contacts the side walls of the channels 120 and at least a portion of the surface of the suspension device 216. The adhesive plugs 232 occupying the securing channels 120 secure the suspension device 216 with the preform 152 to more firmly hold the transducer 14.

When more than one adhesive channel 120 is filled with a cured epoxy resin, a more rigid and integral bond between the suspension device 216 and the preform 152 is established. Preferred embodiments utilize epoxy resins having comparable coefficients of thermal expansion as the materials made from the preform 152 and the suspension diaphragm 16.

An electronics box 140 is located above the suspension device 216 where conduits 140A and 140B are conveyed from the electronics box 140, through the conduit channels 220 and 228, to the transducer 14. The space 19 is shown separating the transducer 14 from the internal surfaces of the container 12.

While the preferred embodiment of the invention has been illustrated and described, as noted above, many changes can be made without departing from the spirit and scope of the invention. Several modifications and variations of the present embodiments are possible in light of the above teachings. For example, other compositions of the compliant preform may that is a heat conductor but electrically non-conductive. Ablefilm 561K® obtained from Ablestik, Inc. Ablefilm 561K® is a fiberglass low-stress epoxy adhesive film formulated to be both a heat conductor and an electrical insulator. Another example is that the securing channels 120 may be linearly configured within the compliant preform 152.

Accordingly, the scope of the invention is not limited by the disclosure of the preferred embodiment. Instead, the invention should be determined entirely by reference to the claims that follow.

The invention claimed is:

1. An apparatus comprising:
 a container having an opening and a flange;
 a transducer;
 a suspension assembly having a diaphragm and a support disposed along the periphery of the opening; and
 a complaint perform affixed between the diaphragm and the transducer;
 wherein the support is affixed to the flange and the diaphgram straddles across the opening and holds the transducer at a space from the interior surfaces of the container.

2. The apparatus of claim 1 wherein the assembly is configured to route conduits between the transducer and to the exterior of the container.

3. The apparatus of claim 2, wherein the suspension assembly has at least one conduit channel through the diaphragm and the perform to route the conduits.

4. The apparatus of claim 3, wherein the perform is electrically non-conductive.

5. The apparatus of claim 4, wherein the perform is heat conductive.

6. The apparatus of claim 1, wherein the diaphragm is affixed to the perform via at lease one securing channel disposed within the perform.

7. The apparatus of claim 6, wherein the securing channel further includes a plurality of securing channels arranged in a planar configuration.

8. The apparatus of claim 7, wherein the securing channel further includes a plurality of securing channels arranged parallel to a longitudinal axis.

9. The apparatus of claim 8, wherein the securing channels are filled with an adhesive such that the adhesive contacts the sidewalls of the channels and at least a portion of the diaphragm.

10. The apparatus of claim 1, wherein support is affixed to the flange by welding.

11. The apparatus of claim 1, wherein support is affixed to the flange by brazing.

12. The apparatus of claim 1, wherein the space is filled with an inert gas.

* * * * *

UNITED STATES PATENT AND TRADEMARK OFFICE
CERTIFICATE OF CORRECTION

PATENT NO.       : 7,194,903 B2
APPLICATION NO.  : 11/012822
DATED            : March 27, 2007
INVENTOR(S)      : Paul Dwyer Page 1 of 1

It is certified that error appears in the above-identified patent and that said Letters Patent is hereby corrected as shown below:

Col. 4, line 43: Delete the word "perform" and substitute therefor the word "preform"

Signed and Sealed this

Fourteenth Day of April, 2009

JOHN DOLL
*Acting Director of the United States Patent and Trademark Office*